United States Patent
Low et al.

(10) Patent No.: US 8,477,323 B2
(45) Date of Patent: Jul. 2, 2013

(54) SYSTEM AND METHOD FOR CONVEYING RENDERING INTENTS

(75) Inventors: James R. Low, Rochester, NY (US); Norman W. Zeck, Ontario, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2145 days.

(21) Appl. No.: 11/158,819

(22) Filed: Jun. 22, 2005

(65) Prior Publication Data

US 2006/0290961 A1 Dec. 28, 2006

(51) Int. Cl.
*G06F 3/12* (2006.01)

(52) U.S. Cl.
USPC ........... 358/1.13; 358/1.9; 358/2.1; 358/3.23; 382/167

(58) Field of Classification Search
USPC .............. 358/518, 3.23, 530, 523–525, 1.13, 358/1.14, 1.15; 700/169, 175, 108, 110
See application file for complete search history.

(56) References Cited

U.S. PATENT DOCUMENTS

| | | | |
|---|---|---|---|
| 6,680,740 B2 | 1/2004 | Krueger | |
| 7,209,261 B2* | 4/2007 | Krueger et al. | 358/1.9 |
| 7,218,405 B1* | 5/2007 | Aschenbrenner et al. | 358/1.15 |
| 7,864,197 B2* | 1/2011 | Brown | 345/629 |
| 2002/0154325 A1* | 10/2002 | Holub | 358/1.9 |
| 2004/0080765 A1* | 4/2004 | Nishide et al. | 358/1.9 |
| 2004/0135791 A1* | 7/2004 | Krueger et al. | 345/589 |
| 2004/0239965 A1 | 12/2004 | Krueger et al. | |
| 2005/0028093 A1 | 2/2005 | Michel et al. | |
| 2006/0007252 A1* | 1/2006 | Mahy et al. | 347/3 |
| 2006/0050288 A1* | 3/2006 | Aschenbrenner et al. | 358/1.9 |

* cited by examiner

*Primary Examiner* — Twyler Haskins
*Assistant Examiner* — Brendan McCommas
(74) *Attorney, Agent, or Firm* — Maginot, Moore & Beck, LLP

(57) ABSTRACT

A system enables a rendering intent to be specified for an object in a page description language that does not support the specifying of rendering intents. Such a system includes a user interface for receiving a rendering intent and an identification of an object associated with the received rendering intent, a page description language (PDL) file generator for generating a tag to associate the identified object with a PDL output parameter, and an encoder for encoding the received rendering intent in the PDL output parameter associated with the identified object. Such a system may be used, for example, with a PostScript or a PDF print job file.

18 Claims, 2 Drawing Sheets

SYSTEM AND METHOD FOR CONVEYING RENDERING INTENTS

TECHNICAL FIELD

The systems and methods described herein relate to printing devices that generate color or black and white reproductions of documents.

BACKGROUND

The reproduction of documents as images on media sheets generally requires the generation of a source file, the translation of the source file, and the interpretation of the translated file to reproduce an image of the source data. In the first stage, a user generates or edits a source document data file using an application program or imaging device. The source data file may include text, images, and graphics as well as font characteristics, format codes, and the like.

To print the source file onto a substrate, the source data file is translated to a page description format that is implemented with a page description language (PDL), such as PostScript, PDF, PCL, PCL, TIFF, SVG, Metro, or the like. The device-dependent data may be translated to a device-independent color space, such as CIELAB, XYZ, a spot color space such as Pantone, or a profile connection space (PCS). PCS space is defined by one of the profiles that have been developed by the International Color Consortium (ICC). The PDL commands and device-independent color data are provided to a marking or print engine for processing. The print engine decomposes the device-independent data and converts the device-independent color data to the color space of an output device, such as an image output terminal (IOT). The decomposition of the document file includes the interpretation of the PDL commands, which enables the print engine to optimize the imaging of individual objects on a page. The printing device may then be used to generate the raster data that are used to print color images of the document.

Generation of the device-independent data also includes the specification of output parameters for the printing of a job at the printing device. Output parameters that may be selected or adjusted for output of a job include the color, weight, coating, opacity, and white point of the substrate on which a document is reproduced.

Another output parameter that may be defined for a print job is called a rendering intent. Examples of rendering intents include "perceptual," "saturation," "absolute calorimetric," and "relative colorimetric," all of which are specified by the ICC. Another rendering intent example is "pure." This rendering intent is specified by the Color Encoding Standard, which is part of the Xerox System Integration Standard published by Xerox Corporation, Palo Alto, Calif., July 1991, XNSS 289107 (hereinafter "The Xerox Color Encoding Standard"). The Xerox Color Encoding Standard describes three reference color systems that attempt to provide device independent color between devices, such as workstations and printers. As is known in the art, each rendering intent specifies an enhancement used for a particular context. For example, "perceptual" makes photographic images more life-like, while "saturation" makes colors brighter and is useful to enhance the look of pie charts, for example. Some output parameters, such as rendering intents, may be specified for different portions or objects of the same page. For example, different rendering intents may be specified for a photographic image, a pie chart, and text that are presented on the same page.

Rendering intents assist the printing device in producing higher quality output. One set of intents may specify a particular halftone that is appropriate for a particular object. For example, a high frequency halftone may be especially appropriate for the edges of text and line art, while a lower frequency halftone may be specified for areas in which the range of color intensities are more important. "Glossmarks" may be implemented by using rendering intents that specify complementary halftones. Also, compression may be used within a real time format that drives a print engine. A rendering intent may be used to identify an appropriate compression for an object, such as lossy compression for JPEG images, for example, or lossless compression, such as flate, LZW, CCITT Group 4 methods for line art and text.

One problem that arises in specifying a rendering intent for objects within a page is the absence of support for the particular output parameter in the program description language used to define the print job. For example, while PostScript and PDF file formats do support color rendering hints, such as "photographic" or "perceptual," they do not support the specification of other rendering intents, such as halftone selection or compression. Instead, an imager in a printing device interprets the PostScript or PDF file data and infers some of the rendering intents for an object. If a PostScript imager, for example, encounters a PostScript line drawing command, the image may infer that the pixels of the line should be generated with a rendering intent appropriate for either edge or interior line art. Alternatively, the image may analyze the overall intermediate representation of a page and use segmentation algorithms to infer particular rendering intents. This type of analysis evaluates contiguous areas of a representation of a page to determine where edges and images occur, as is well known within the art. In general, therefore, many typically used print job file formats do not support the direct specification of rendering tags for objects within a page.

SUMMARY

A system that addresses the need for specifying a rendering intent in a page description language file includes a user interface for receiving a rendering intent and an identification of an object associated with the received rendering intent, a page description language (PDL) file generator for generating a tag to associate the identified object with a PDL output parameter, and an encoder for encoding the received rendering intent in the PDL output parameter associated with the identified object. Such a system may be used, for example, with a PostScript, a PDF, a PCL, a TIFF, a SVG, or a Metro print job file.

In one embodiment of such a system, the PDL output parameter associated with an identified object for specifying a rendering intent is the spot color output parameter. By storing a rendering intent identifier in the spot color output parameter, a decomposer determines that the spot color tint code stored with the spot color output parameter identifies a rendering intent for the object associated with the spot color output parameter by the generated tag. In one embodiment, the rendering intent identifier is the alphanumeric string "INTENT" and the spot color tint is a number having a value of 0 to 255. The spot color tint value may be used to index into a table of rendering intents so the decomposer can identify a rendering intent or set of rendering intents for the associated object. The rendering intents may be implemented as an overprinting spot color. An object would the be specified twice. The object is first specified with a desired output color. The object is specified the second time with a spot color that is used to specify the rendering intents. An important feature to note is overprinting of the spot color. Otherwise, the original object color would be lost.

A method for specifying rendering intents in a page description language comprises receiving a rendering intent and an identification of an object associated with the received rendering intent, generating a tag to associate the identified object with a page description language (PDL) output parameter, and encoding the received rendering intent in the PDL output parameter associated with the identified object. The method may be used to specify rendering intents for objects in PostScript, PDF, PCL, TIFF, SVG, or Metro files, for example.

The encoding of the rendering intent may be implemented as already noted with the spot color output parameter of a PDL. When the spot color output parameter is used, a rendering intent identifier may be included in the spot color parameter to indicate the spot color identifies a rendering intent for the associated object. Furthermore, the spot color tint code may be used to indicate a specific rendering intent for the associated object.

The above described features and advantages, as well as others, will become more readily apparent to those of ordinary skill in the art by reference to the following detailed description and accompanying drawings.

DETAILED DESCRIPTION

Figure 1:
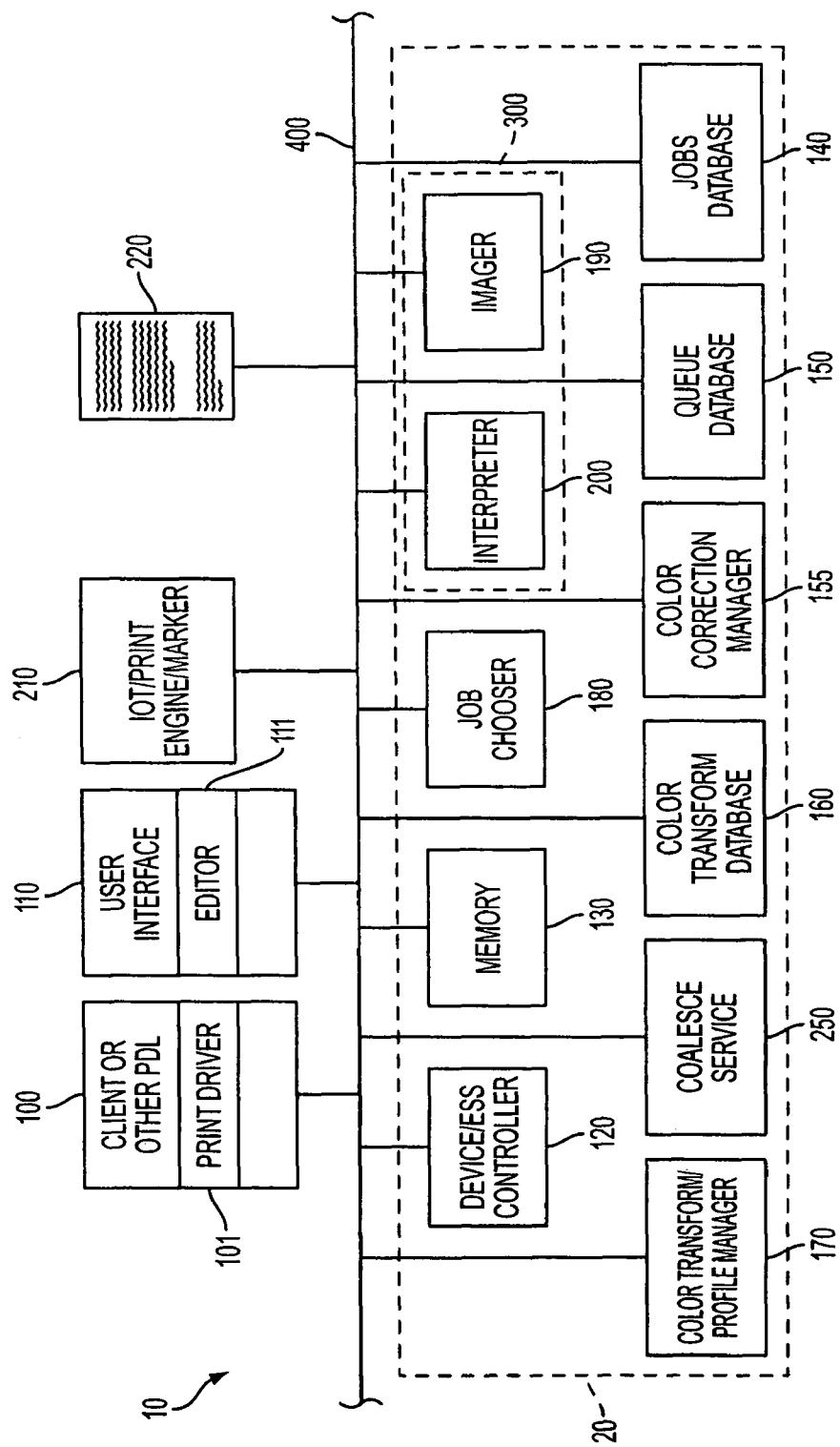
FIG. 1 shows a block diagram of a system in which rendering intents may be specified despite the lack of a specific output parameter dedicated to specific rendering intents.

FIG. 1 shows an exemplary embodiment of a digital imaging system 10 that may used to specify a rendering intent for an object. The digital imaging system 10 includes a client 100, an image processing system 20 and an image output terminal/print engine/marker 210. The client (and/or other page description language file generator) 100 operates as a source of the image data to be rendered and output by the print engine 210 onto suitable media. The image processing system 20 includes a digital front end (DFE) that processes digital image data received from the client 100 and converts the image data into rasterized print ready data that is supplied to an image output terminal/print engine/marker 210. In response to the print ready data, the image output terminal/print engine/marker 210 generates an output document 220 on suitable media. In order to specify a rendering intent for an object even though the PDL file generator 100 does not support that rendering intent output parameter, another PDL output parameter is used to identify and specify a rendering intent for an object. The digital front end of the image processing system 20 also includes a decomposer 300 that interprets the data for the PDL output parameter in a manner that enables a rendering intent to be specified for an object.

As shown in FIG. 1, the client 100 may comprise a computer, a scanner or any similar or equivalent image input terminal (image source) and further may include one or more applications, drivers and operating systems that facilitate providing digital image data, which may comprise any combination of grayscale data, ASCII text characters, bitmap or bytemap images, graphic primitives, high level graphics or page description language, such as PostScript, PDF, PCL, TIFF, SVG, Metro, or the like. The client 100 further includes a print driver 101 or similar tool for compiling job programming attributes, including color attributes, and assembling the attributes and image data into a print job, for example, that may be forwarded to and stored in a print job database 140.

The print driver 101 is accessible to a user via a graphical user interface (GUI) 110, which may include an editor 111. The graphical user interface 110 provides an interface that enables a user to select and communicate job programming attributes to the image processing system 20. Job programming attributes describe selected parameters by which a print job may be processed and may include parameters for page layout (e.g., size, orientation, duplex), color options (e.g., brightness, contrast, saturation), media type, finishing options (e.g., output tray, collate, staple, binding), and the like. In addition to selecting parameters for the print job, the graphical user interface 110 and the print driver 101 may be used to set additional or alternate job attributes on a per-page basis for selected pages. These special attributes to be used for selected pages within a job are often referred to as page exceptions. Similarly, the ability to set different attributes on a per-page basis is sometimes referred to as page-exception programming.

In addition to setting additional or alternate job attributes on a per page basis, the graphical user interface 110 and the print driver 101 may be used to set color space output parameters for a print job on an object-by-object basis. Such objects include, but are not limited to, text portions, constant color portions, sampled color portions, and image portions of a page. In the exemplary embodiment shown in FIG. 1, the user interface 110 may be used to specify a rendering intent for an object. To do so, the user, for example, may enter a "Glossmark™" rendering intent in association with the object to which the rendering intent is to be applied. In response, the user interface forwards the rendering intent data that were received from the user to the PDL file generator 100 along with the associated object for incorporation in the PDL file for the print job.

At the PDL file generator, a rendering intent identifier is generated for an output parameter. The PDL file generator also generates a tag associating the object to be rendered with the rendering intent received from the user interface 110. The generation of such a tag and association of a tag with an object in a print job are well known. The PDL file generator 100 also includes an encoder that generates a code for the output parameter associated with the object. The code identifies the rendering intent or set of rendering intents that were received from the user interface 110. The rendering intent identifier and the generated code are stored as an output parameter for the object associated with the output parameter by the generated tag. The interpretation of the output parameter is discussed more fully below.

In one embodiment of a system 10, the output parameter used to specify a rendering intent is a spot color output parameter. Such an output parameter is well known and is typically supported by PDLs. A spot color is a type of separation color space that may be defined in a PDL, such as PostScript, PDF, PCL, TIFF, SVG, or Metro. Each spot color has an identifying name, such as "Xerox Red." A density or tint may also be specified for a spot color. The density typically ranges from 0.0 to 1.0 and these densities are encoded with the values of 0 to 255. In separation printing, spot colors are inks that are used in addition to the standard cyan, magenta, yellow, and black inks frequently used in color printers. In digital printing, a spot color is often a process color that is generated from a combination of cyan, magenta, yellow, and black colors. In PostScript file processing, objects in spot colors are written to the appropriate area of a page after the original contents of the page are erased. In overprint mode, however, the spot color is printed without erasing the other colors being used in the area.

In the system 10, a page of objects, including text, images, line art, and the like, are described by the PDL file generator 100 in a known manner. Even for objects for which a rendering intent is to be specified, the object is first specified with its standard color attributes that describe a desired output color for the object. The object is then specified a second time with its color being specified as a specific tint of a particular spot color and the "overprint" graphics state variable is set to "true." In response to receipt of a rendering intent for an object, the file generator generates a rendering intent identifier for an output parameter. For example, the name "Intent" may be generated as a spot color name. The rendering intent data received from the user interface is also provided to the encoder so that a code identifying the rendering intent is generated. Thus, an overprint spot color may be identified by the name "Intent" and the accompanying tint code is interpreted as a particular rendering intent. The overprint graphics state variable being true causes the rendering intent to be implemented without the originally specified color being lost.

The image processing system 20 includes one or more print queues for receiving input data, such as a print job. Each print queue is configured with a set of queue attributes. The queue attributes provide a set of processing parameters in the same manner as job attributes. Specifically, the queue attributes may be programmed by a system administrator or similar user. Furthermore, in addition to an attribute value, each queue attribute set on the print queue can be independently assigned a queue qualification of either "override" or "default." The value of the queue qualification is used to determine precedence when reconciling job attributes and queue attributes. In this manner, each print queue can be thought of as a virtual printer wherein sending a print job to a print queue picks up attributes of that print queue.

The image processing system 20 further includes a job chooser 180 which retrieves print jobs from print queues, for example, that are forwarded to and stored in a print queue database 150, and reconciles the color attributes set at the client 100 with the color attributes associated with the print queue to which the job was submitted, thereby generating a set of reconciled attributes. After reconciling the attributes, the job chooser 180 passes the print job and reconciled attributes to a decomposer 300. At the end of the reconciliation operation, each color related attribute will have a qualification of either "override" or "default".

The decomposer 300 receives the resolved print job from the job chooser 180 and processes the received image data therein to produce print ready data (which may be binary or contone data) that is supplied to the image output terminal/print engine marker 210. In response to print ready data, image output terminal/print engine/marker 210 generates the output document 220 on suitable media. The image output terminal/print engine/marker 210 is preferably an electrophotographic engine; however, the image output terminal/print engine/marker 210 may include such equivalent alternatives as ink jet, ionographic, thermal, Computer-to-Plate systems, offset films, and the like devices/systems.

More specifically, the decomposer 300 includes an imaging manager/imager 190, which may comprise what is generally known in the art as an interpreter 200 and an imager 190, to reconcile the reconciled attributes from the job chooser 180 with any attributes embedded in the page description language image data ("internal" qualification) to generate a set of final attributes. The reconciliation of the attributes may be based on a precedence model. Given the final set of attributes, the imaging manager/imager 190 identifies the source profile and the destination profile to use for color space transformation.

The interpreter 200 is a page description language interpreter which receives a page description language document from the job chooser 180. The interpreter 200 then parses the page description language stream into various image related components that are subsequently stored in the print job database 140 and later referenced using identifiers. The identifiers of job components are passed from the interpreter 200 to a coalesce service 250 for font processing and bitmap processing. Coalesced information is then imaged by the imager 190 to bits which are transmitted to the image output terminal/print engine/marker 210 to be rendered, for example, on paper. Additionally, coalesced information in the print job database 140 can be edited using the editor 111 through the graphical user interface 101 prior to transmission to image output terminal/print engine/marker 210.

Upon receipt, the interpreter 200 of page description language decomposer 300 parses the image primitives of the page description language stream arriving through interface 400. Each image primitive is stored in the print job database 140 before being imaged to bits by the imager 190. Some of the image primitives parsed are modified or overridden by the interpreter 200. In the system shown in FIG. 1, the interpreter 200 detects the spot color output parameter associated with an object through its tag. The spot color name is parsed and, in one embodiment, the name "Intent" indicates that the spot color identifies a rendering intent for the object. The spot color tint code is then used by the interpreter 200 to identify the specific rendering intent for the object. In one embodiment, the spot color tint code may be used as an index into a table of rendering intents so the appropriate rendering intent may be selected for printing the object. The selected rendering intent is then provided to the raster image processor (RIP) for the generation of the bit data required for printing the page. In one embodiment, the rendering intent is processed as an overprint spot color in the generation of the bit data by the RIP. As noted above, this embodiment helps preserve the originally specified color as the rendering intent is implemented.

The selected color defines the color that the interpreter 200 stores in the print job database 140. Once a page description language stream of image data has been parsed by the interpreter 200, and the page description language stream's image components have been stored and referenced using identifiers in the print job database 140, the identifiers of job components are passed from the interpreter 200 to the coalesce service 250 for font processing and bitmap processing. Coalesced information is then imaged by the imager 190 to bits which are transmitted to the image output terminal/print engine/marker 210 to be rendered, for example, on a page. The page description language does not have to be re-written to accomplish this rendering of color information.

The imager 190, using an appropriate source profile, translates the image data from the input color space into a common device-independent color space, for example, profile connection space (PCS). Once in the device-independent color space, the imager 190 operates on the data to perform any color adjustments requested in the final attributes. The image data is then translated into device-dependent color space data, for example, CMYK data, via information in the appropriate destination profile. Once in the device-dependent color space, the imager 190 performs any requested control operations, such as, for example, trapping, anti-aliasing, halftoning, black overprint, spot color overprint, and the like.

To perform color space transformations, the imager 190 obtains selected attributes from the set of final attributes and builds a transformation query. The transformation query is passed to a color profile manager (CPM) 170 which retrieves the appropriate ICC profile from a color transform/profile database 160. To support the color profile manager 170 and the profile database 160, the image processing system 20 includes a color collection manager (CCM) 155.

Color correction manager 155 maintains the color transform/profile database 160 which comprises two types of records: profile records (i.e., ICC source and destination profiles) and profile assignment records. Specifically, color correction manager 155 operates to generate, modify, obtain and/or delete profile records. The color correction manager 155 may beneficially include an associated graphical user interface, such as the user interface 111, which enables a user to perform the operations for generating, modifying, obtaining and/or deleting operations. Assignment records exist for destination profiles only and are used to associate an ICC destination profile with media attributes and emulation attributes.

The image processing system 20 may be a separate device from, or integrated with the other elements of the digital reproduction device that is capable of producing a hard copy image output. Furthermore, the image processing system 20 may be implemented as software. Other configurations of the elements shown in FIG. 1 may be used without departing from the spirit and scope of this invention.

The decomposer 300 may include plural interpreters 200, any of which may analyze page description language files. Examples of known page description languages include PostScript, TIFF, PDF and PCL (e.g., PCL5C and PCL5E). Thus, for example, one interpreter may be a PostScript interpreter, a second interpreter may be a TIFF interpreter, a third interpreter may be a PDF interpreter, and a fourth interpreter may be a PCL interpreter. Other interpreters that may be included are SVG, Metro, or the like. Although one embodiment has been described as using the spot color output parameter to specify the rendering intent for an object, other output parameters may be used. The output parameter selected should be capable of incorporating a rendering intent identifier to indicate the output parameter is specifying a rendering intent. Additionally, the output parameter should include a value that may be used to specify the particular rendering intent to be used for printing an object.

The controller 120 controls the flow of data and the operations of the other components within the image processing system 20. The control of such data flow and image processing system operations is well known.

The memory 130 may store any programs needed for operation of the image processing system 20, and may, if necessary, serve as a buffer during input or output of data to or from the image processing system 20, and/or during processing of the data within the image processing system 20. The memory 130 shown in FIG. 1 may be implemented using any appropriate combination of alterable, volatile or non-volatile memory or non-alterable, or fixed, memory. The alterable memory, whether volatile or non-volatile, may be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The reader should understand that each of the elements shown in FIG. 1 may be implemented as portions of a suitably programmed general purpose computer, special purpose computer, microprocessor or the like. For example, the circuits can be implemented as software executing on a programmed general purpose computer, a special purpose computer, a microprocessor or the like. In this case, the image processing system 20, or any of its components, may be implemented as a routine embedded in a printer driver, as a resource residing on a server, or the like. The image processing system 20 may also be implemented by physically incorporating it into a software and/or hardware system, such as the hardware and software systems of a printer or a digital photocopier. Alternatively, each of the elements shown in FIG. 1 may be implemented as physically distinct hardware circuits within an ASIC, or using a FPGA, a PLD, a PLA or a PAL, or using discrete logic elements or discrete circuit elements. The particular form each of the circuits shown in FIG. 1 will take is a design choice and may be obvious and predictable to those skilled in the art.

Figure 2:
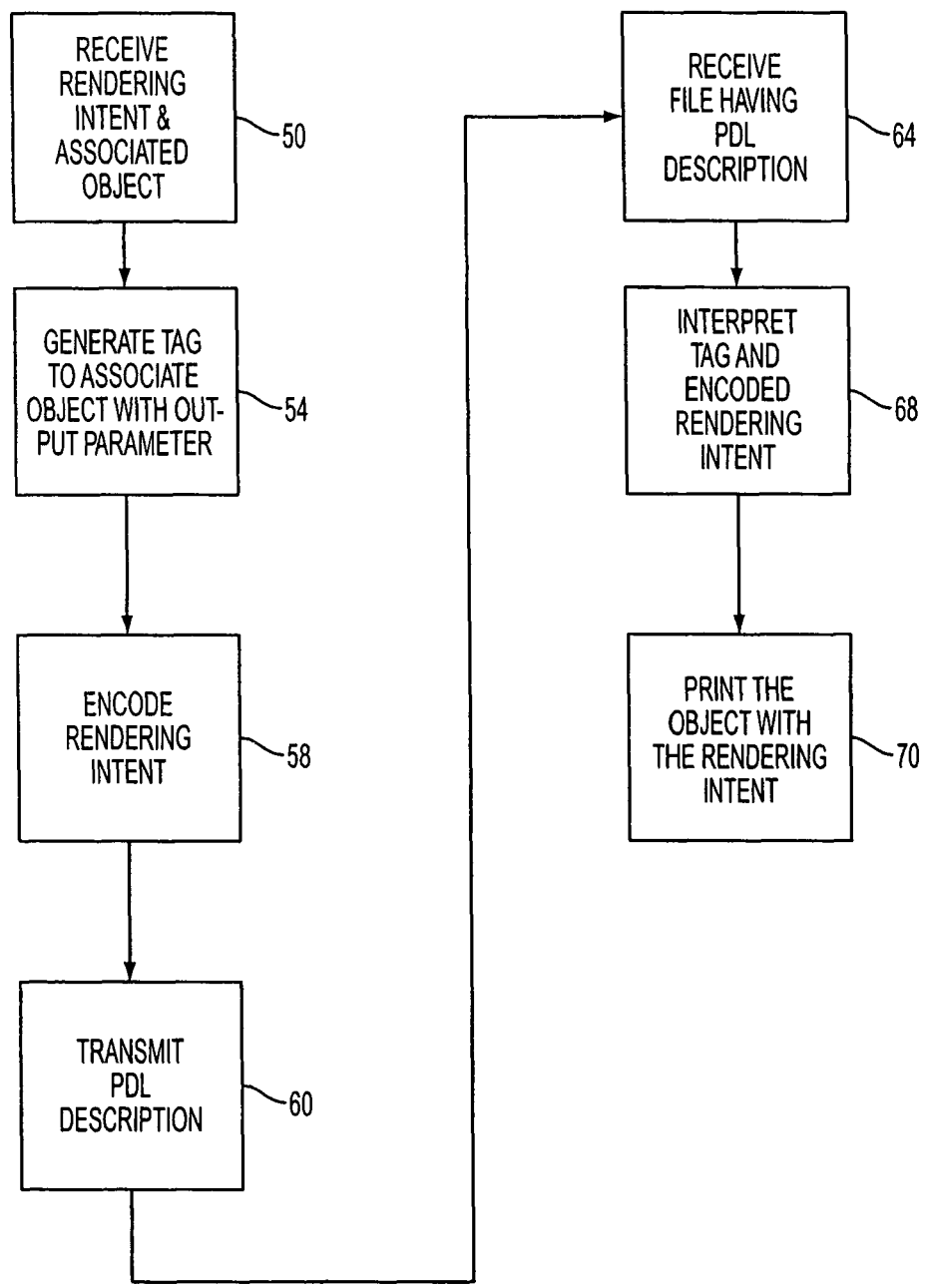
FIG. 2 is a flow diagram of a process for specifying a rendering intent using a spot color output parameter.

A method for specifying a rendering intent in a PDL file with an output parameter not typically associated with a rendering intent is shown in FIG. 2. The method includes receiving a rendering intent and an identification of an object associated with the received rendering intent (block 50). A tag is generated to associate the identified object with a page description language (PDL) output parameter (block 54). The generation of the tag may include generating a rendering intent identifier for the PDL output parameter, such as the "Intent" name described above for the spot color output parameter of the PostScript, PDF, PCL, TIFF, SVG, or Metro formats. The rendering intent is also encoded in the PDL output parameter associated with the identified object (block 58). The encoding of the rendering intent encoding may include generating a tint code for the spot color output parameter that identifies the rendering intent associated with the identified object as noted previously. Alternatively, the rendering intent identifier and encoded rendering intent may be provided in the alpha channel of other known PDL formats, such as SVG or TIFF. The PDL description of the page including the various objects in the page along with the output parameters specified for the objects is transmitted to the decomposer for print job processing (block 60).

The file containing the PDL description of the generated tag, the identified object, and the encoded PDL output parameter is received at a PDL interpreter (block 64). The generated tag and the encoded PDL output parameter code are interpreted (block 68). This interpretation includes the selection of a set of rendering intents for the identified object in accordance with the encoded PDL output parameter. The identified object is then printed using the selected rendering intents (block 70).

The reader will appreciate that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for specifying rendering intents in a page description language comprising:
   a user interface for receiving a rendering intent and an identification of an object associated with the received rendering intent;
   a page description language (PDL) file generator configured to specify an output color for the identified object with a standard color attribute and to generate an identifier that enables a PDL interpreter to detect a PDL output parameter as a rendering intent parameter and a tag to associate the identified object with the PDL output parameter; and an encoder configured to generate a code that enables the PDL interpreter to identify the received rendering intent for printing of the object associated by the tag to the PDL output parameter, the identifier that enables detection of the PDL output parameter as a rendering intent parameter and the code that identifies the received rendering intent being stored for the PDL output parameter associated with the identified object to preserve the specification of the output color with the standard color attribute while enabling identification of the PDL output parameter as a rendering intent parameter for the identified object and as enabling identification of the received rendering intent for printing of the identified object with reference to the code stored for the PDL output parameter.

2. The system of claim 1 wherein the PDL output parameter is a PDL overprinted spot color output parameter; and the identifier enables detection of the PDL overprinted spot color output parameter as the rendering intent parameter and indicates that the code stored for the PDL overprinted spot color output parameter identifies the rendering intent for printing of the identified object.

3. The system of claim 1 wherein the PDL output parameter is an alpha channel.

4. The system of claim 2, the encoder further comprises:

a spot color tint generator that generates the code that enables the PDL interpreter to identify the received rendering intent, the code generated by the spot color tint generator being stored for the spot color output parameter associated with the identified object by the generated tag.

5. The system of claim 1 wherein the PDL file generator generates a PostScript tag.

6. The system of claim 1 wherein the PDL file generator generates a Portable Document Format (PDF) tag.

7. The system of claim 1 further comprising:

a decomposer configured to receive a file having the generated tag with the associated identified object along with the identifier that enables detection of the PDL output parameter as the rendering intent parameter and the code stored for the PDL output parameter;

an interpreter configured to detect the PDL output parameter as the rendering intent parameter for the identified object associated with the tag and to select with reference to the code stored for the PDL output parameter a set of rendering intents for the identified object associated with the tag; and a print engine configured to print the identified object with reference to the selected set of rendering intents.

8. A method for specifying rendering intents in a page description language (PDL) comprising:

receiving through a user interface a rendering intent and an identification of an object associated with the received rendering intent;

specifying an output color for the identified object with a standard color attribute;

generating an identifier that enables a PDL interpreter to detect a PDL output parameter as a rendering intent parameter and a tag to associate the identified object with the page description language (PDL) output parameter; and encoding the received rendering intent by storing a code that enables the PDL interpreter to identify the received rendering intent for printing the identified object and the identifier for the PDL output parameter associated with the identified object to preserve the specification of the output color with the standard color attribute while enabling identification of the PDL output parameter as the rendering intent parameter for the identified object and enabling identification of the received rendering intent for printing the identified object with reference to the code stored for the PDL output parameter.

9. The method of claim 8, the identifier generation includes:

generating the identifier to enable detection of a PDL spot color output parameter as the rendering intent parameter for the identified object associated with the generated tag.

10. The method of claim 9, the encoding includes:

storing the code for the PDL spot color output parameter to enable interpretation of the received rendering intent for printing of the identified object.

11. The method of claim 8, the identifier generation includes:

generating the identifier to enable detection of an alpha channel as the rendering intent parameter.

12. The method of claim 10, the encoding further includes:

storing a tint color code that enables identification of the received rendering intent for the PDL spot color output parameter associated with the identified object by the generated tag.

13. The method of claim 8, the tag generation includes:
generating a PostScript tag.

14. The method of claim 8, the tag generation includes:
generating a Portable Document Format (PDF) tag.

15. The method of claim 8 further comprising:

receiving a file having the generated tag, the identified object, and the code and the rendering intent identifier stored for the PDL output parameter;

interpreting the identifier to detect the PDL output parameter as the rendering intent parameter;

selecting a set of rendering intents for the identified object with reference to the code; and rendering the identified object with the selected set of rendering intents.

16. A system for specifying rendering intents in a page description language (PDL) comprising:

a user interface for receiving a rendering intent and an identification of an object associated with the received rendering intent;

a page description language (PDL) file generator configured to specify an output color for the identified object with a standard color attribute and to generate an identifier that enables a PDL interpreter to detect a PDL overprinted spot color output parameter as a rendering intent parameter and a tag to associate the identified object with the PDL overprinted spot color output parameter; and a spot color tint generator configured to generate a tint color code that enables the PDL interpreter to identify the received rendering intent for printing of the identified object associated with the PDL overprinted spot color output parameter by the tag, the identifier and the generated tint color code being stored for the PDL overprinted spot color output parameter that is associated with the identified object to preserve the specification of the output color by the standard color attribute while enabling identification of the PDL overprinted spot color output parameter as the rendering intent parameter for the identified object and as enabling identification of the received rendering intent for printing of the identified object with reference to the code stored for the PDL overprinted spot color output parameter.

17. The system of claim 1 wherein the PDL file generator generates the identifier as a PostScript identifier.

18. The system of claim 1 wherein the PDL file generator generates the identifier as a Portable Document Format (PDF) identifier.

* * * * *